Feb. 7, 1956 R. J. IFIELD 2,733,606
LIQUID FLOW RATE METERS
Filed Dec. 21, 1954 2 Sheets-Sheet 1

Inventor
R. J. Ifield
By: Glascock Downing Seebold
Attys.

Feb. 7, 1956   R. J. IFIELD   2,733,606
LIQUID FLOW RATE METERS
Filed Dec. 21, 1954   2 Sheets-Sheet 2
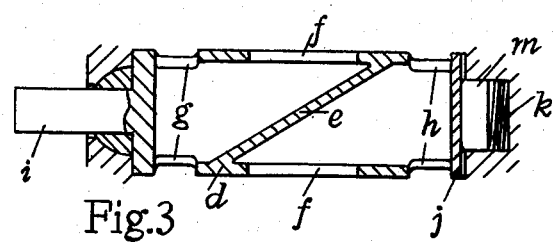
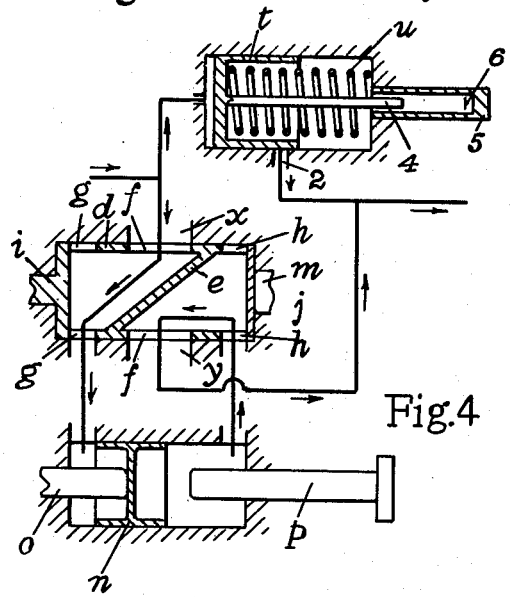
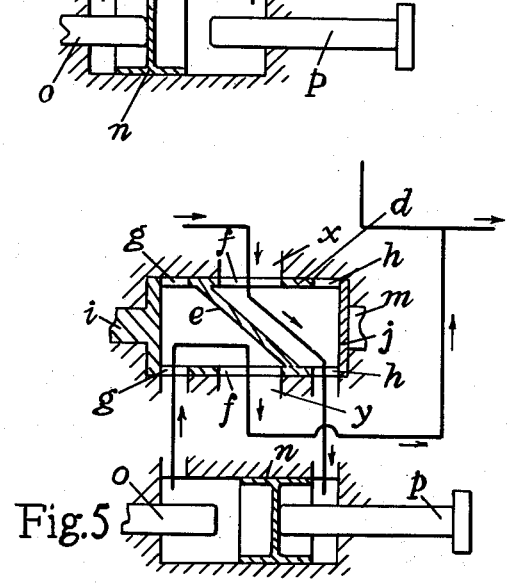
Inventor
R. J. Ifield

United States Patent Office 2,733,606
Patented Feb. 7, 1956

2,733,606

LIQUID FLOW RATE METERS

Richard Joseph Ifield, Dural, New South Wales, Australia, assignor to Joseph Lucas (Industries) Limited, Birmingham, England Application December 21, 1954, Serial No. 476,735

Claims priority, application Great Britain December 24, 1953

1 Claim. (Cl. 73—239)

This invention has for its object to provide in a simple and convenient form, a meter for measiuring the rate of flow of liquid.

A meter in accordance with the invention comprises the combination of a body part having therein an inlet and an outlet and also three cylindrical bores, a reciprocatory piston freely movable in one of the bores, an adjustable stop for varying the range of movement of this piston and provided with a calibrated scale, a rotary valve contained in another of the said bores for controlling the action of the liquid on the said piston, a spring-loaded piston in the third bore adapted to establish direct communication between the inlet and outlet when moved by a predetermined pressure of the liquid, and an indicator actuated by the spring-loaded piston.

In the accompanying drawings:

Figure 3 is a sectional plan of the rotary valve.

Figures 4 and 5 are diagrammatic views illustrating the mode of action of the meter.

Figure 1:
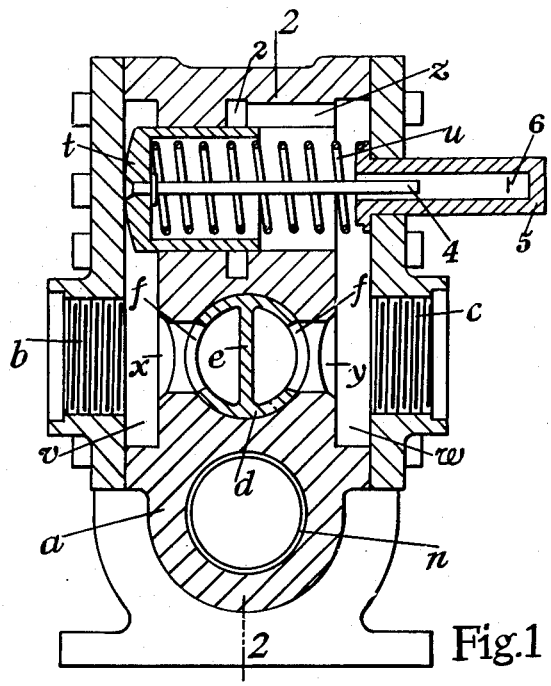
Figure 1 is a sectional end elevation, and Figure 2 a sectional side elevation (on the line 2—2, Figure 1) illustrating a meter embodying the invention.
Figure 2:
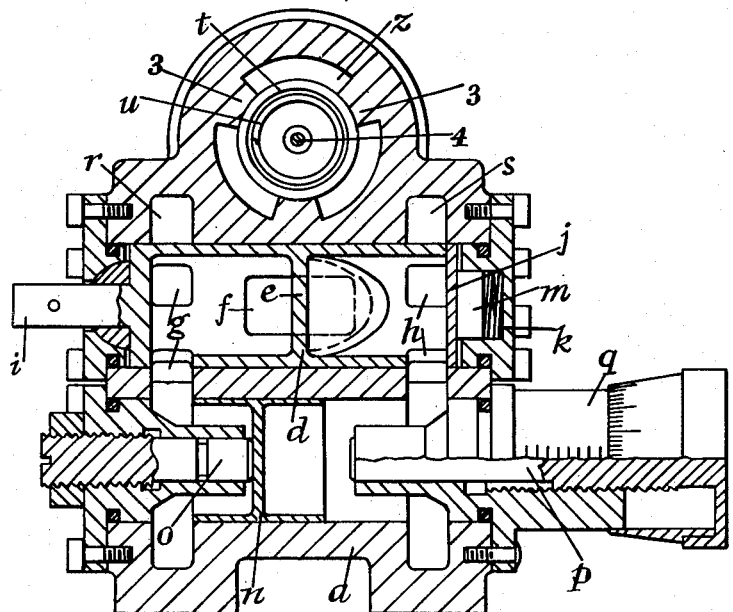

Referring to Figures 1–3, the body part $a$ is provided with an inlet $b$ and an outlet $c$, these being situated at oposite sides of the body part and adapted for connection thereto of pipes for conveying the liquid. In the body part are formed three cylindrical bores arranged one above another. In the central bore is contained a rotary valve $d$, this being intended to be rotated at a known and constant rate by a synchronous electric motor or other convenient source of motion. The valve is of hollow cylindrical form and is divided into two equal compartments by an obliquely disposed partition $e$. At opposite sides of the centre of the valve are formed a paitr of ports $f$, and at its ends are provided ports $g$, $h$. At one of the closed ends of the valve is provided a driving spindle $i$. The opposite end is closed in any convenient manner; in the example illustrated it is closed by a disc $j$ which is held in position by a spring $k$ acting through a pressure piece $m$.

In the bore beneath the containing the valve, is contained a reciprocatory piston $n$ which is freely movable by the liquid acting alternately on its opposite ends. Movement of the piston in one direction is limited by a fixed stop $o$ which can be pre-set to any desired position. Movement in the opposite direction is regulated by an axially movable stop $p$ which has a screw-thread connection with a rotatable micrometer $q$ attached to one side of the body part. The micrometer is suitably graduated in terms of the rate of flow of liquid, such as, for example, gallons per hour.

The two bores above mentioned have their axes parallel with each other, and their ends are interconnected by cavities $r$, $s$ formed in the body part.

The third bore is situated above the other two, and its axis is disposed at right angles to them. This bore contains a piston $t$ which is loaded by a low-rated spring $u$, such that the piston can be moved by the liquid in opposition to the spring at a pressure which is small relatively to that of the liquid. The ends of this bore are in communication respectively with the inlet and outlet by way of cavities $v$, $w$ formed in the body part. Also these cavities communicate with the bore containing the rotary valve by way of ports $x$, $y$. The cavity $w$ opens at its upper end into an annular space $z$ surrounding one end of the piston, and this space terminates at one end in an annular port 2, which when exposed by the closed end of the piston establishes communication between the cavities $v$, $w$ by way of the said annular space $y$. To support the open end of the piston, the adjacent part of the body has formed on it three longitudinal ribs 3 as shown in Figure 2. Further there is formed on or secured to the piston a stem 4 which serves as an indicator. This stem extends into a hollow enclosure 5 preferably made at least in part from transparent material, and bearing a reference mark 6 which, when the outer end of the stem 4 coincides with it, indicates that the closed end of the piston coincides with the approach-edge of the annular port 2.

The mode of action of the meter will be readily understood by reference to Figures 4 and 5. Liquid enters the meter at $b$ and emerges at $c$. Assuming that the rotary valve is at rest, the pressure of the liquid acting on the piston $t$ will move the latter against the action of the spring $u$ until the piston exposes the port 2. The liquid will then flow only through the upper bore of the meter. When it is required to measure the rate of flow, the valve actuating means is set in motion. During rotation of the valve its ports $f$ are successively brought into coincidence with the ports $x$, $y$. In one position (as shown in Figure 4) the liquid can flow through the port $x$ into the left hand compartment of the valve and thence to the corresponding end of the bore containing the piston $n$. The effect of this is to move the piston $n$ to the right and thereby displace liquid from the other side of the piston to the other compartment of the valve, and from this compartment through the port $y$ to the outlet, as shown in Figure 4. When the other port $f$ in the rotary valve comes into coincidence with the inflow port $x$, the direction of flow through the valve is reversed as shown in Figure 5, and the piston $n$ is returned to its previous position.

Assuming that the stop $p$ is in such a position as will allow maximum movement of the piston $n$, the whole of the flow will then occur through the valve and the bore containing the piston $n$, and the piston $t$ will be moved by the spring $u$ to its initial position in which it closes the port 2. The operator then, by manipulation of the micrometer head $q$, gradually moves the stop $p$ inwardly, thus reducing the flow through the valve and the bore containing the piston $n$. This will be accompanied by a progressive increase of the liquid pressure acting on the piston $t$, causing the latter to move, the movement being rendered visible to the operator by the indicator. At the critical position of the stop $p$, the liquid pressure acting on the piston $t$ will move the closed end of the latter into coincidence with the approach edge of the port 2, and consequently move the outer end of the stem $q$ into coincidence with the reference mark 6. When this condition is reached, the operator ascertains the rate of flow by reading the micrometer head. The measurement of the rate of flow depends on the rate of rotation of the valve and the volume of the liquid displaced by movements of the piston $n$.

The first of these factors is predetermined (as the volve is rotated at a known rate), and the second is determined by adjustment of the mocrometer, the latter being suitably graduated to give the operator a direct reading of the rate of flow.

By this invention a meter for measuring the rate of flow of a liquid is provided in a very simple and convenient form. The meter is applicable to a variety of uses, but it is intended more particularly for measuring the rate of flow of liquid fuel under pressure to an engine.

Having thus described my invention what I claim as new and desire to secure by Letters Patent is:

A liquid-flow rate meter comprising in combination a body part having therein an inlet and an outlet and also three cylindrical bores, a reciprocatory piston freely movable in one of said bores, an adjustable stop for varying the range of movement of said piston and provided with an adjusting micrometer graduated in terms of liquid flow, a valve rotatable at a constant rate in another of said bores, ports and cavities being provided in said valve and the body part of connecting said inlet and outlet to opposite ends of the piston-containing bore during a part of each revolution of said valve, and for reversing such connections during another part of each revolution of said valve, a spring-loaded piston movable in the third bore by liquid pressure, said third bore being in communication at one end with said inlet and at a position between its ends with said outlet so that direct communication is established between said inlet and outlet when said spring-loaded piston assumes a predetermined position under the pressure of liquid admitted to said third bore from said inlet, and an indicator operable by said spring-loaded piston.

References Cited in the file of this patent
UNITED STATES PATENTS 2,104,373   McNeil et al. _____ Jan. 4, 1938

FOREIGN PATENTS 109,727   Switzerland _____ Apr. 16, 1925